April 25, 1961
G. E. WHITE
2,981,415
SOFT-WATER SYSTEM
Filed July 1, 1957
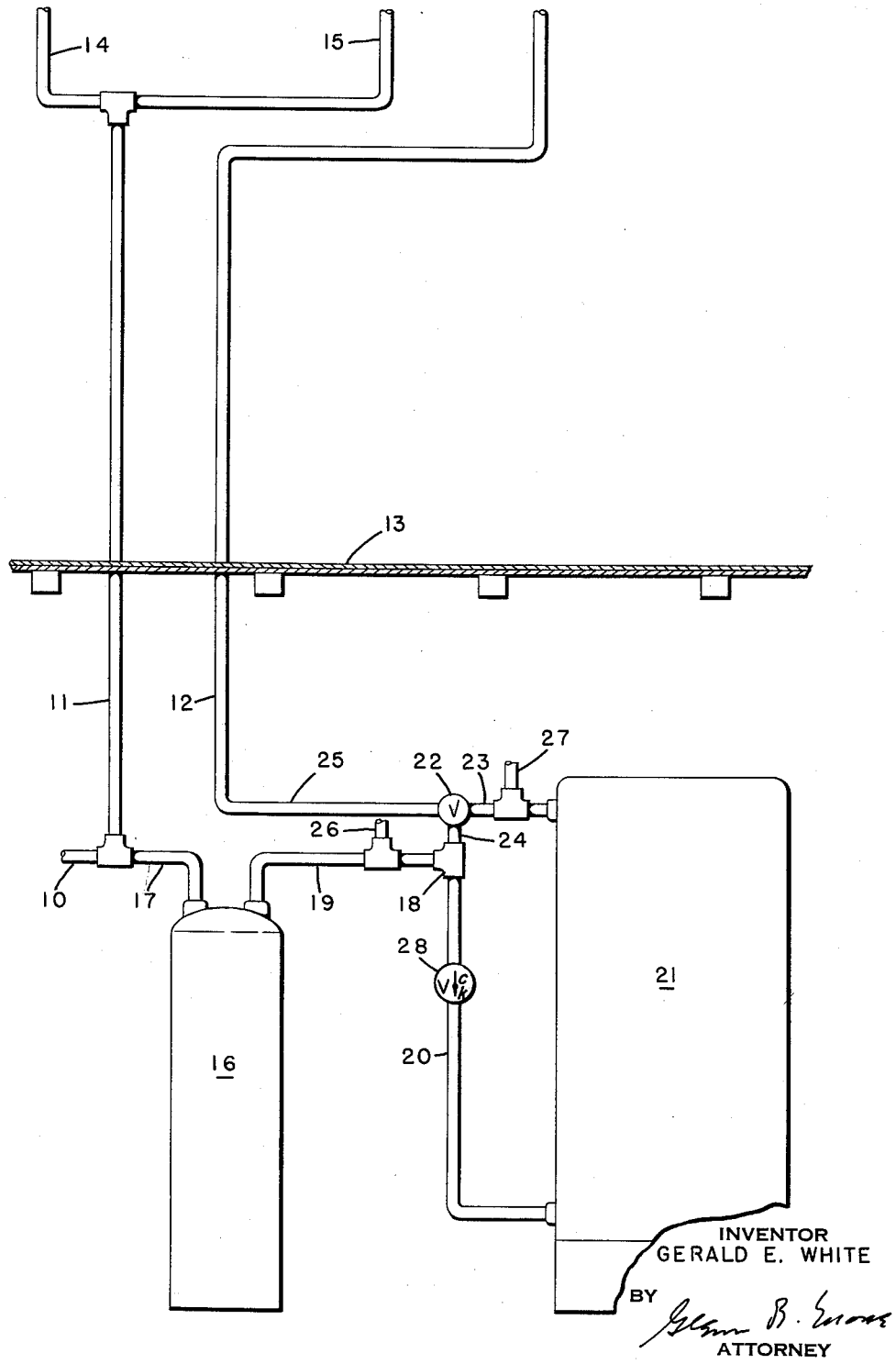
INVENTOR
GERALD E. WHITE
BY
ATTORNEY

United States Patent Office 2,981,415
Patented Apr. 25, 1961

2,981,415

SOFT-WATER SYSTEM

Gerald Emery White, 747 South Shore Drive, Holland, Mich.

Filed July 1, 1957, Ser. No. 668,947

2 Claims. (Cl. 210—149)

This invention relates to the installation of soft-water systems in existing buildings. The value of soft water is usually realized only in fixtures and equipment where soap is used. The cost of operating a softener is determined largely by the flow through it, and the isolation of the fixtures in the house which do not require soft water so that they may continue to be supplied with hard water results in considerable economy. A toilet, for example, may be supplied exclusively with hard water without interfering to any extent with the function of the unit.

The equipment where the soft water is most useful is ordinarily that which also utilizes heated water. The wash basin, the shower, laundry equipment, and similar units should be supplied with soft water in order to make economical usage of soap, and to obtain the best service from the fabrics to which the soap solutions are applied. In an existing building, however, it is usual to find a dual pipe system, one pipe being for cold and the other for hot water. The mixing of the output of these two pipes at the particular fixture is determined by the setting of the faucets, and is adjusted to suit the needs of the user at the time. If no further step were taken than the application of a softening unit to the hot water pipe, much of the value of soft water would be lost because of the mixture of hard cold water with the softened hot water. If the ultimate in a piping system were being installed in a new building, it would no doubt be advisable to utilize a three-pipe system rather than the usually-encountered dual arrangement. One pipe could be used for the cold water, and another set of two pipes could be used for hot and cold soft water. As a practical matter, it is not desirable to install a third pipe in an existing building, and it becomes desirable to make the best use possible of the existing dual pipe arrangement.

Applicant has provided a system which results in the delivery of warm water at the various fixtures where it is required, and at approximately the temperature at which it is ordinarily used. This warm water is delivered through the second pipe of the existing dual pipe system, and it is a mixture of hot and cold soft water which is established prior to the delivery of it to the existing dual pipe system. The details of this invention will be analyzed further through a discussion of the particular embodiments illustrated in the accompanying drawing. The drawing presents a schematic diagram of an installation in an existing building.

Referring to the drawing, a cold (hard) water supply pipe is indicated at 10, and which is normally connected to a pump or to a water meter. The vertical pipes 11 and 12 represent the existing dual pipe system in the walls of a building, and a floor structure as indicated at 13. The equipment illustrated below the floor level is normally installed in the basement. The branch 14 communicating with the pipe 11 may be connected to a toilet, with the branch 15 being used to deliver cold hard water to a wash basin or shower. The pipe 12 is utilized for delivering pre-mixed flow of warm soft water to the same wash basin or shower.

A water softener 16 is connected to the water supply 10 by the conduit 17, and the inlet of the water softener 16 is connected to the water supply 10 with the conduit 17. The outlet of the softener is connected to a T fitting 18 by the conduit 19. The pipe 20 extends from this fitting to the inlet of the water heater 21. The outlet of the water heater is connected to one inlet branch of the thermostatically-controlled mixing valve 22 by the connection 23, and the other inlet branch of the valve communicates with the T fitting 18 through the short connection 24. The outlet of the mixing valve 22 is delivered to the pipe 12 through the section 25. As a result of this arrangement, a flow of soft water at a pre-determined temperature is delivered to the pipe 12, and this temperature is preferably set to be slightly above that which is normally desired for contact with the skin. After the water has been standing in the pipe for some time, the resulting temeprature is usually acceptable directly; but after substantial flow has taken place, it may be desirable to mix with the warm soft water a small amount of cold hard water to arrive at the precise temperature desired. Such small quantities are usually not sufficient to seriously interfere with the softness characteristics of the water for practical purposes. The extra connection 26 is provided for convenience if it may be desirable to use a softened cold water somewhere in the basement area, and the connection 27 provides a source of softened hot water. These latter two connections are conveniently utilized in laundry equipment which is ordinarily located in the basement.

The mixing valve 22 provides an opportunity for the development of an undesirable self-induced circulation of water through the heater 21, the connection 23, and the pipe 20. The pipe 20 represents the "cold" leg of the circuit, and the increased weight of the water cooled by the heat dissipation from the pipe 20 will create a small pressure differential tending to induce a circulation which can cause a considerable heat loss if the mixing valve 22 is remote from the heater. To eliminate the circulation, the biased check valve 28 is used. This valve is very lightly loaded to permit flow under line pressure without substantial interference, but the biasing is selected to be sufficient to oppose the small pressure differential of the self-induced system outlined above. This valve may be placed anywhere in the pipe 20, the heater 21, the connection 23, or incorporated in the mixing valve 22.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A system for supplying soft water in a building having a water supply and a water heater, and having a dual pipe installation extending in the wall structure of said building, comprising: means connecting one pipe of said dual pipe system directly to said water supply; water softener means having the inlet thereof connected to said water supply, the outlet of said water softener being connected to the inlet of said water heater; thermostatically-controlled mixing valve means having inlet branches respectively connected to the outlet of said hot water heater and to the outlet of said water softener means; and means connecting the outlet of said mixing valve means to the second pipe of said dual pipe system.

2. A system for supplying soft water in a building having a water supply and a water heater, and having a dual pipe installation extending in the wall structure of said building, comprising: means connecting one pipe of said dual pipe system directly to said water supply; water softener means having the inlet thereof connected to said water supply, the outlet of said water softener being connected to the inlet of said water heater; mixing valve means having inlet branches respectively connected to the outlet of said hot water heater and to the outlet of said water softener means; means connecting the outlet of said mixing valve means to the second pipe of said dual pipe system; and biased valve means adjusted to prevent flow through said heater under thermally-induced pressure differentials developed from heat dissipation in conduits connecting said mixing valve means and said heater, said biased valve means providing no substantial opposition to water supply pressure.

References Cited in the file of this patent

UNITED STATES PATENTS

| | | |
|---|---|---|
| 372,232 | Newman | Oct. 25, 1887 |
| 620,947 | Moore | Mar. 14, 1899 |
| 1,635,745 | Ellis | July 12, 1927 |
| 1,698,342 | McGill | Jan. 8, 1929 |
| 1,773,976 | Erickson | Aug. 26, 1930 |
| 1,947,594 | Heijkenskjold | Feb. 20, 1934 |